W. D. Andrews,

Gearing.

No. 100,839. Patented Mar. 15, 1870.

Witnesses:
Fred. Hayne
R. G. Rabeau

Wm. D. Andrews

UNITED STATES PATENT OFFICE.

WILLIAM D. ANDREWS, OF NEW YORK, N. Y.

IMPROVEMENT IN FRICTION-WHEELS FOR GEARING.

Specification forming part of Letters Patent No. 100,839, dated March 15, 1870.

*To all whom it may concern:*

Be it known that I, WILLIAM D. ANDREWS, of the city, county, and State of New York, have invented a new and useful Improvement in Friction-Wheels or Gearing for Communicating Motion, of which the following is a full, clear, and exact description, reference being had to the accompanying drawing, forming part of this specification, and in which—

Figure 1:
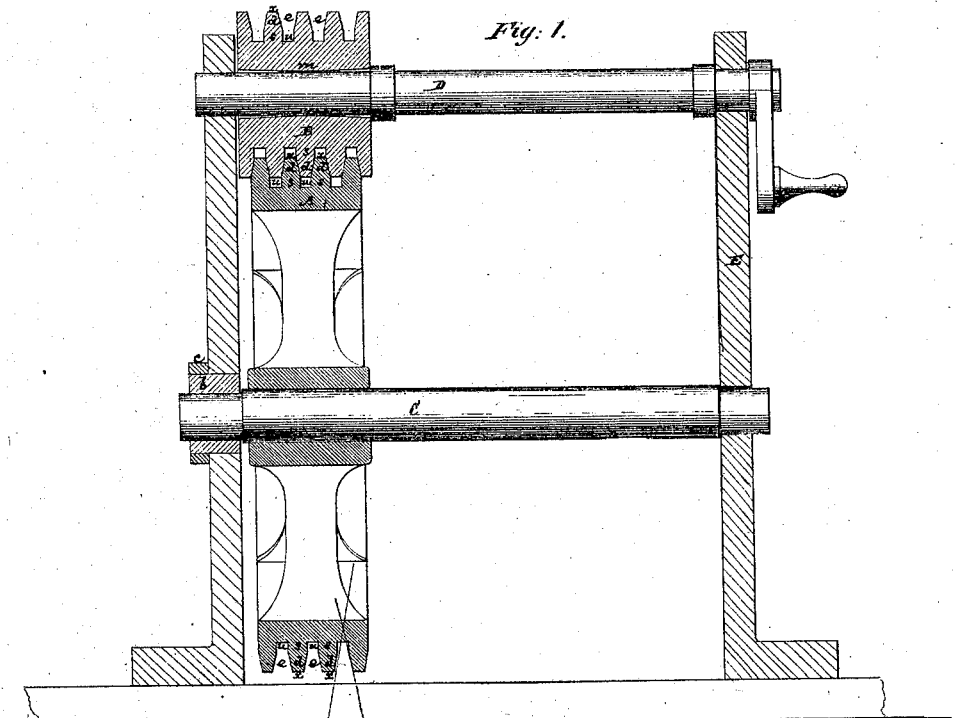
Figure 2:
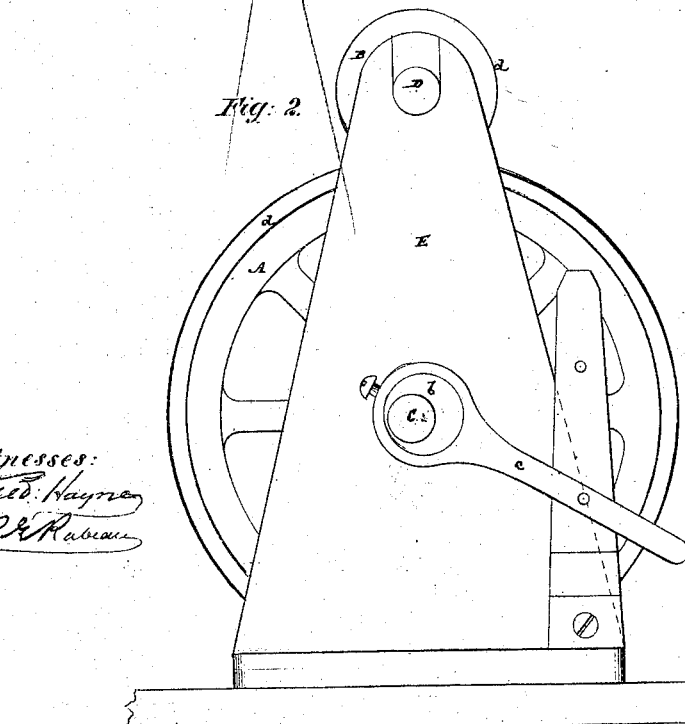

Figure 1 represents a friction-wheel and pinion in gear with each other, constructed in accordance with my improvement, and as arranged for operation within a stand or frame; Fig. 2, a side view of the same.

Similar letters of reference indicate corresponding parts.

My improvement has reference to friction-wheels having annular teeth or grooves extending around their peripheries, for the purpose of communicating motion, such wheels, when geared together, fitting by their annular teeth and grooves the one into the other.

These wheels, as heretofore constructed, have been but little used, and are objectionable, owing to the fact that, the ends of the teeth traveling faster than their bases, and the ends of the teeth on one wheel being in contact with the bases of those upon the other, a dragging, sliding, or cutting friction results, which not only consumes a large amount of power without useful effect, but causes great and unequal wear upon the teeth, diminishes the useful frictional surface in contact, and rapidly destroys the wheel.

If the teeth are made full cones in their transverse section, as is ordinarily done, their points will soon bottom and prevent the contact of the sides; and if, as is sometimes done, the points of the teeth are shortened, the sides of the points wear into the bases, and eventually form new bottoms, on which they roll, thereby preventing the contact of the sides.

In my invention the teeth are comparatively short, which reduces the lost or sliding friction to a minimum, and, as a consequence, the wear also; but as more or less wear must necessarily occur, I make the teeth, in their transverse sections, in the form of truncated cones standing upon bases whose sides are perpendicular to the faces of the wheel, and which are separated from each other by spaces equal in width to the thickness of the end of a tooth.

The effect of this construction is that, notwithstanding the wear, the original amount of frictional surface is always maintained in contact.

Under such a construction the surfaces in contact for a given breadth of face are less than when full-cone teeth are used; but by reason of the provision made for keeping the same amount of surface in contact at all times, I am enabled practically to use teeth having a greater angle to the surface of the wheel, and consequently, under a given pressure, obtain a largely increased useful frictional effect between the two wheels or surfaces in gear.

The objections incidental to previous constructions, as hereinbefore referred to, are accordingly, by my improvement, avoided, and wheels made as I have devised last longer and communicate power with a greatly decreased loss from friction.

To compensate for any inequalities in the side faces of the teeth, and to keep them in contact, I slightly enlarge the bore of the hubs of one wheel of each pair in contact at each end, tapering to the center, at which point it fits snugly on its axle, which admits of a slight lateral rocking motion of such wheel on its axle or shaft, that serves to keep the faces in close contact, notwithstanding any small variation from their proper lines, which it is difficult or impossible to wholly avoid.

A wheel constructed in accordance with my improvement may either be used to gear with another wheel of similar construction, or it may work upon or in connection with a straight surface having a like construction of teeth and grooves.

Referring to the accompanying drawing, A represents a friction-wheel, and B a friction-pinion, arranged to gear with each other, and constructed in accordance with my invention, said wheel and pinion being hung on shafts C and D, having their bearings in a frame, E, so that by turning the shaft D of the pinion B motion is communicated through the wheel A to the shaft C; or the wheel may be made the driver of the pinion.

Frictional contact of the wheel and pinion may be established and broken, or be adjusted as wear renders necessary, by means of an eccentric bearing, $b$, to the wheel-shaft B, operated by a lever, $c$; or any other suitable means for such purpose or purposes may be employed.

The annular teeth *d* and intervening grooves *e*, arranged to extend around the peripheries of the wheel and pinion, whereby frictional gear is established between the latter, are of the improved form I have hereinbefore referred to, said teeth in their cross-section having the shape of truncated cones standing upon bases *s*, whose sides are perpendicular to the face of the wheel, and separated from each other by spaces *u* equal in width to the thickness of the end *x* of a tooth.

When it is desired to transmit motion to or from the inside instead of the outside of the wheel, then the annular teeth and grooves should be arranged on the interior instead of the exterior of the wheel's periphery.

To compensate for any inequalities in the side faces of the teeth, by admitting of a lateral rocking action to one of the friction-wheels, whether having their annular teeth and grooves of the form described in their cross-action or otherwise, the bore of the hub portion *m* of the pinion B is here shown as of a slightly-enlarged diameter at each end, tapering to the center, and fitting its axle snugly at that part.

What is here claimed, and desired to be secured by Letters Patent, is—

1. A friction-wheel for transmitting motion by means of annular teeth, with intervening grooves arranged around its periphery, having its teeth, in their transverse section, made in the form of truncated cones standing upon bases whose sides are perpendicular to the face of the wheel, and separated from each other by spaces equal in width to the thickness of the ends of the teeth in gear with said wheel, substantially as specified.

2. In combination with an annular toothed and grooved friction-wheel, the hub or bore thereof constructed, substantially as herein described, by making the same of a slightly-enlarged diameter at each end, tapering to the center, where it is made to fit snugly its axle or shaft, essentially as and for the purpose herein set forth.

WM. D. ANDREWS.

Witnesses:
FRED. HAYNES,
HENRY PALMER.